United States Patent [19]
Riley

[11] 3,760,398
[45] Sept. 18, 1973

[54] DEVICE FOR DETECTING FLAME OUT IN A GAS TURBINE

[75] Inventor: Edward D. Riley, Marblehead, Mass.

[73] Assignee: The United States of America as represented by the Secretary of the Army, Washington, D.C.

[22] Filed: July 7, 1971

[21] Appl. No.: 160,387

[52] U.S. Cl.................... 340/228.1, 313/30, 73/346
[51] Int. Cl....................... G08b 21/00, G01n 27/30
[58] Field of Search.......................... 340/228.1, 228; 313/30, 31; 73/346, 194 EM, 339 R, 359, 362 R

[56] References Cited
UNITED STATES PATENTS

| | | | |
|---|---|---|---|
| 3,459,039 | 8/1969 | Grey | 73/339 R X |
| 3,580,078 | 5/1971 | Mackenzie | 340/228 X |
| 3,138,025 | 6/1964 | Fingerson | 73/190 X |
| 3,167,956 | 2/1965 | Grey | 73/339 R X |
| 2,766,440 | 10/1956 | Marsden, Jr. | 340/228.1 UX |
| 2,701,324 | 2/1955 | Peroutky et al. | 313/30 X |
| 1,235,935 | 8/1917 | Shaw | 313/30 |
| 2,600,928 | 6/1952 | Semm | 340/228.1 UX |
| 3,301,307 | 1/1967 | Nishigaki et al. | 340/228.1 X |

*Primary Examiner*—John W. Caldwell
*Assistant Examiner*—William M. Wannisky
*Attorney*—Harry M. Saragovitz et al.

[57] ABSTRACT

A device for detecting the presence or absence of a flame in the combustion chamber of a gas turbine or the like consisting of a pair of spaced, tubular electrodes extending through the wall of the chamber and into the gas stream. Combustion occurring in the chamber and the associated ionization produces electrically charged electrons in the gaseous gap between the electrodes. The voltage output is in the form of varying resistance of the gap. When no combustion is present in the chamber, the resistance approaches infinity and with combustion the resistance reduces to a level measurable below infinity. The electrodes are cooled by circulating air to give them a longer life.

6 Claims, 6 Drawing Figures

Patented Sept. 18, 1973 3,760,398
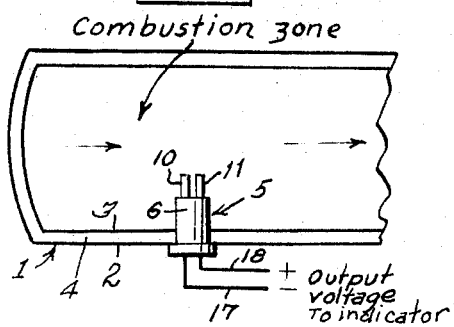
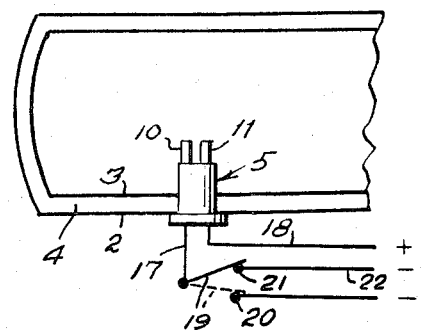
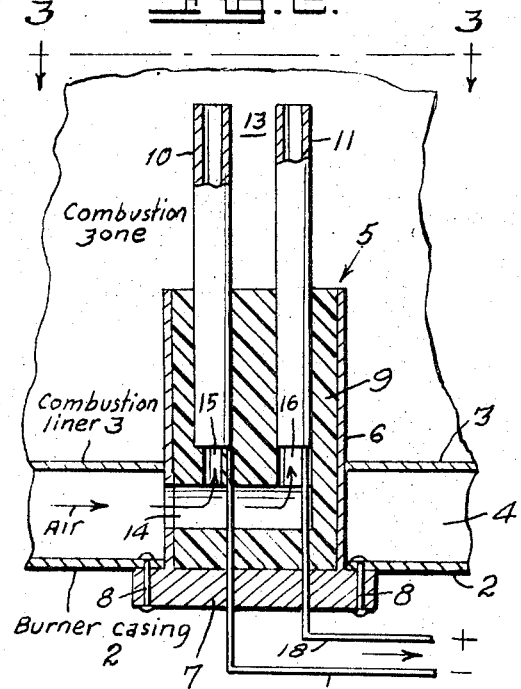
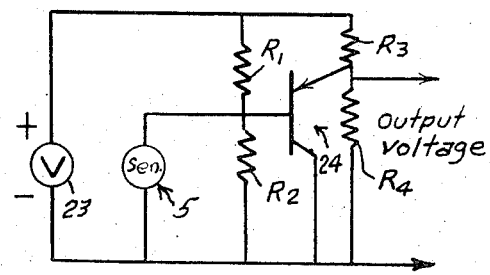
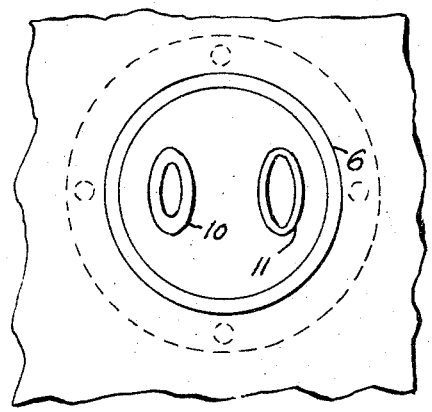
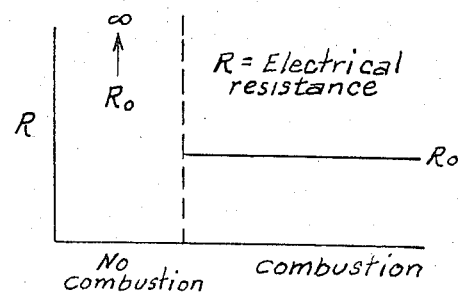
INVENTOR,
Edward D. Riley
BY: Harry M. Saragovitz,
Edward J. Kelly & Herbert Berl
ATTORNEYS.

3,760,398

DEVICE FOR DETECTING FLAME OUT IN A GAS TURBINE

BACKGROUND OF THE INVENTION

Flame detecting devices in present use generally comprise a transparent window in the wall of the combustion chamber or a thermocouple extending into the gas stream. The window was subject to clouding and/or breakage. The thermocouple was subject to burn-out, hence a shorter life.

SUMMARY OF THE INVENTION

The present invention is designed to overcome the aforesaid disadvantages by a pair of hollow electrodes which are cooled by air circulating through them. This permits the electrodes to operate at a lower temperature than a thermocouple which must operate at gas combustion temperature. Hence, the electrodes of this invention will have a longer life and operate more efficiently for a longer time. The time response of the sensor of the invention is only limited by the residence time of the combustion gas in the combustion chamber. It is therefore a principal object of this invention to provide a flame sensor of mechanical simplicity and capable of longer life due to its indestructable nature.

DRAWING DESCRIPTION

FIG. 1 is a schematic view showing the sensor of this invention mounted in the wall of a combustion chamber;

FIG. 2 is an enlarged sectional detail view of the sensor;

FIG. 3 is a top view of the sensor as looking in the direction of the arrows 3—3 of FIG. 2;

FIG. 4 is a view similar to FIG. 1 showing the sensor wired for use as both a flame detector or an igniter;

FIG. 5 is an alternate circuit for use as an indicator of the sensor's voltage output, and, FIG. 6 is a graph showing the varying resistance of the gaseous gap between the electrodes.

DETAILED DESCRIPTION

FIG. 1 illustrates, generally, the combustion chamber 1, e.g., of a gas turbine, and includes a casing 2 and a combustion liner 3 which is spaced from the casing to provide an annulus 4 therebetween.

The sensing device of the invention is indicated generally by 5 and is best viewed in FIG. 2 and consists of a tubular holder 6 which extends through the casing 2 and liner 3 as shown. Holder 6 may be secured to the casing 2 by any suitable means, as an example, by an integral flange 7 which is bolted to casing 2 by bolts 8. The tubular portion of holder 6 is filled with an electrical insulating material 9. A pair of spaced, tubular electrodes 10 and 11 are partially encased at their lower ends in material 9 so that their upper portions extend into the gas stream of the combustion chamber 1. Electrodes 10 and 11 are metal and will be of a type metal suitable for collecting charged electrons produced by combustion which will be present in a gaseous gap 13 between the separated electrodes. As viewed from FIG. 3, electrode 10 has a smaller bore than electrode 11, since electrode 10 is the negative one and electrode 11 is the positive one, it does not require as much cooling as the positive electrode 11 for efficient operation. An air port 14 communicates between annulus 4 and the interior of material 9 and branch ports 15 and 16 provide communication between master port 14 and the bores in electrodes 10 and 11, respectively. Electrical leads 17 and 18 connected to electrodes 10 and 11, respectively, may be connected to a suitable e.m.f. indicator such as a voltmeter, not shown.

Operation of the device is based on the theory that when there is combustion in the combustion chamber, the associated ionization will produce electric charges, negative and positive in the gap 13 between the electrodes 10 and 11. Being electrically conductive an amount of voltage is produced which is conducted from the electrodes 10 and 11 to an indicator.

It will be observed from FIG. 2 that the bore of electrode 10, the negative one, is of less diameter than the bore of electrode 11, the positive one. Therefore the negative electrode is not cooled as much by air as the positive one in order to take advantage of electron emission from the negative electrode.

The cooling air will circulate from the annulus 4 through the hollow electrodes 10 and 11. The temperature of the exposed electrode ends must be high enough to prevent carbon formation.

The life of the electrodes may be extended by making the electrodes of wider cross section which would allow for considerable deterioration while preserving its structural integrity.

To save excessive hardware in the combustion chamber, the sensing device 5 can be used both as a sensor and an igniter to start combustion in the combustion chamber, as seen in FIG. 4 wherein a switch in lead 17 is movable between a pair of terminals 20 and 21 and a third lead 22. When switch 17 contacts terminal 21, leads 18 and 22 will conduct an electric current from a source not shown, and when switch 19 contacts terminal 20, the circuit is provided for the voltage output from the sensor to the indicator, also not shown.

An alternative means for indicating the voltage output of sensor 5 is shown in FIG. 5 wherein a transistor circuit is used. The sensor 5 and a voltmeter 23 is in circuitry with a transistor switch 24 and resistors R1–4 as shown. When there is no combustion in the combustion chamber, the transistor 24 will be back biased. At the onset of combustion, transistor 24 will be forward biased and the output voltage will drop to zero. The resistance associated with the sensing device is expected to be less than $10^{+6}$ ohms.

It is apparent from the foregoing that an improved flame detecting device has been devised that offers a simple and novel means of sensing the presence or lack of a flame in the combustion chamber of a gas turbine or the like.

What is claimed is:

1. For use with a combustion chamber having a double wall:

a device for detecting the presence or absence of a flame in said combustion chamber, comprising
an electrically insulating holder adapted to extend through said double wall,
a pair of laterally spaced elongated tubular hollow electrodes mounted in said holder, said electrodes being of sufficient length to extend into the combustion zone in said combustion chamber,
a pair of electrical leads extending from said electrodes exteriorly of said combustion chamber to electrical indicator means for indicating the presence or absence of flame-caused ionization electric current flowing between said electrodes in said combustion zone, and air passage means extending through said holder for interconnecting the air space between the outer and inner wall of said double wall with the interiors of said hollow electrodes for circulating cooling air therethrough, whereby said electrodes are cooled in the regions of said electrodes which are exposed to the ionization effects of said flame, said air passage means comprising a master port through the side of said holder, a branch port leading from said port to the interior of one of said electrodes, and a branch port leading from said master port to the interior of the other of said electrodes.

2. A device for detecting the presence or absence of a flame in a combustion chamber having a wall, said device comprising an electrically insulating holder extending through said wall, a pair of laterally spaced elongated hollow tubular electrodes mounted in said holder and extending into the combustion zone in said combustion chamber, electrical indicator means connected to said leads exteriorly of said chamber for indicating the presence or absence of flame-caused ionization electric current flowing between said electrodes in said combustion zone, passage means extending through said holder for circulating a cooling gas through the interiors of said hollow electrodes for cooling the portions of said electrodes in said combustion zone which are exposed to the ionization effects of said flame, and means for maintaining the negative of electrodes at a higher temperature than the positive of said electrodes to stimulate electron emission from said negative electrode in the presence of said flame.

3. A device according to claim 2, wherein the negative of said electrodes has a lesser diameter than the positive of said electrodes, whereby less cooling air is admitted to said negative electrode then to said positive electrode.

4. For use with a combustion chamber having a double wall:

a device for detecting the presence or absence of a flame in said combustion chamber, comprising an electrically insulating holder adapted to extend through said double wall, a pair of laterally spaced elongated tubular hollow electrodes mounted in said holder, said electrodes being of sufficient length to extend into the combustion zone in said combustion chamber, a pair of electrical leads extending from said electrodes exteriorly of said combustion chamber to electrical indicator means for indicating the presence or absence of flame-caused ionization electric current flowing between said electrodes in said combustion zone, air passage means extending through said holder for interconnecting the air space between the outer and inner wall of said double wall with the interiors of said hollow electrodes for circulating cooling air therethrough, whereby said electrodes are cooled in the regions of said electrodes which are exposed to the ionization effects of said frame; and means for maintaining the negative of said electrodes at a higher temperature than the positive of said electrodes to stimulate electron emission from the negative of said electrodes in the presence of said flame.

5. A device according to claim 4, wherein said air passage means comprise a master port through the side of said holder, a branch port leading from said port to the interior of one of said electrodes, and a branch port leading from said master port to the interior of the other of said electrodes.

6. A device according to claim 4, wherein the negative of said electrodes has a lesser diameter than the positive of said electrodes, whereby less cooling air is admitted to said negative electrode than to said positive electrode.

* * * * *